April 30, 1946.     R. J. STEWART ET AL     2,399,300
FILLING APPARATUS AND VALVE
Filed Aug. 29, 1941     2 Sheets-Sheet 1

Inventors:
Robert J. Stewart,
Henry H. Franz,
By Cushman Darby Cushman
Attorneys

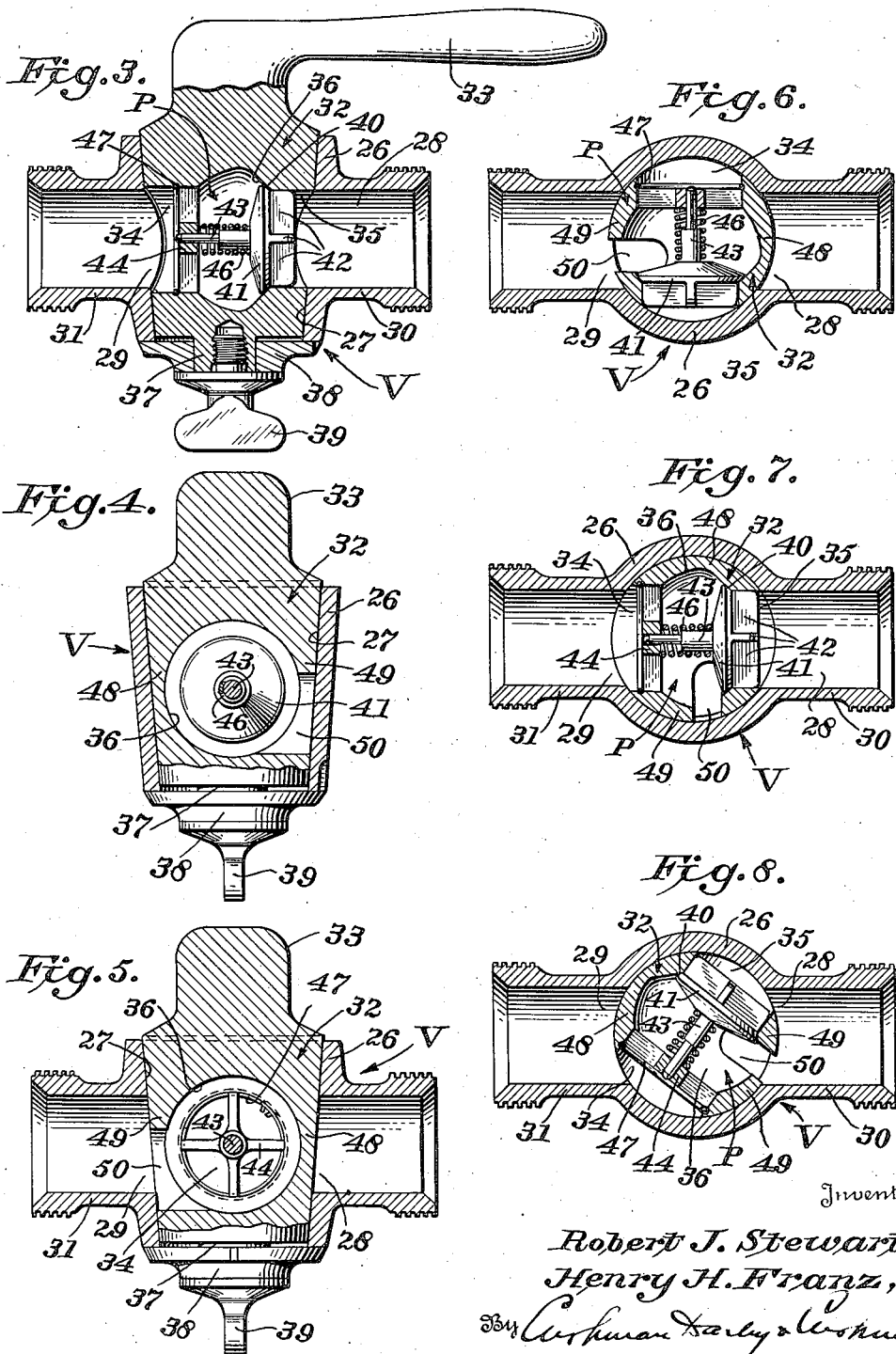

Patented Apr. 30, 1946

2,399,300

UNITED STATES PATENT OFFICE 2,399,300

FILLING APPARATUS AND VALVE

Robert J. Stewart and Henry H. Franz, Baltimore, Md., assignors to Crown Cork & Seal Company, Inc., Baltimore, Md., a corporation of New York Application August 29, 1941, Serial No. 408,874

3 Claims. (Cl. 226—116)

This invention relates to filling apparatus including a supply line and valve means therein responsive to pressure in the line for the purpose of shutting off the same when the line pressure falls below a certain minimum.

For the purpose of illustration, the invention will be considered as applied to a vacuum milk filling system such as is disclosed, for example, in our application Serial No. 341,744, filed June 21, 1940, and since issued as Patent Number 2,364,400. According to the said application, a filler bowl or tank is provided with a float controlled valve at the end of the supply line which terminates within the bowl and a vacuum connection is made with the bowl above the liquid level, the vacuum serving to draw up excess liquid and foam at the end of the filling operation and return it to the bowl through vent tubes associated with the filler heads. When the liquid supply is exhausted, air is drawn through the line and the float valve under the level of the liquid in the bowl and continues to pass through the liquid until the level falls below the float valve or until the supply line is cut off. This air flow creates considerable foam which is detrimental to the efficient operation of the machine.

According to the present invention, there is disposed in the supply line a valve which is urged toward closed position with a force which is overcome by the suction effect plus the normal pressure in the line in advance of the valve, the valve closing when the pressure falls below a certain minimum, such fall being a concomitant of a failing supply. Preferably the valve is of duplex type comprising, for example, a rotary plug carrying a spring-pressed check valve. In one position of the plug, the check valve, through response to liquid pressure, controls the supply line. In another position of the plug, the supply line is completely cut off, and in still another position of the plug the check valve is bypassed. The strength of the check valve spring is so chosen that with the normal degree of vacuum in the bowl, the head of liquid under which the check valve will open is approximately six inches. This is variable, however, and adjustment for a larger or smaller head can be made by varying the strength of the spring. The various structural features involved will be described in detail with reference to the illustrative showing of the accompanying drawings, in which:

Figure 3 is a vertical section of the valve in open position.

Figure 4 is a vertical section of the valve with the parts in the relation shown in Figure 3, the section plane being at right angles to that of Figure 3.

Figure 5 is a vertical section like that of Figure 3 of the valve but with the parts in a different or cut-off relation.

Figure 6 is a horizontal section of the valve with the parts in the same relation of Figure 5.

Figure 7 is a horizontal section of the valve with the parts in the open relation of Figure 3, and Figure 8 is a horizontal section of the valve with the parts in a still different relationship for draining.

Figure 1:
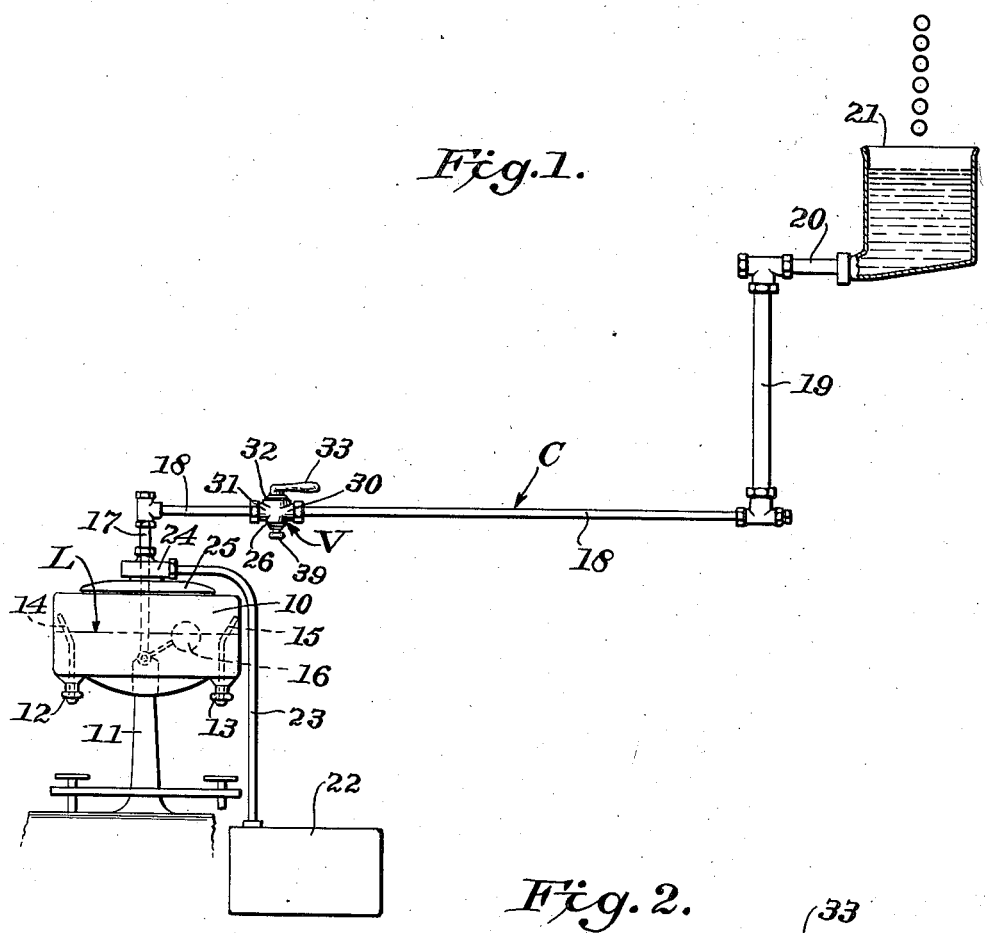
Figure 1 is an elevation of a system in accordance with the present invention.
Figure 2:
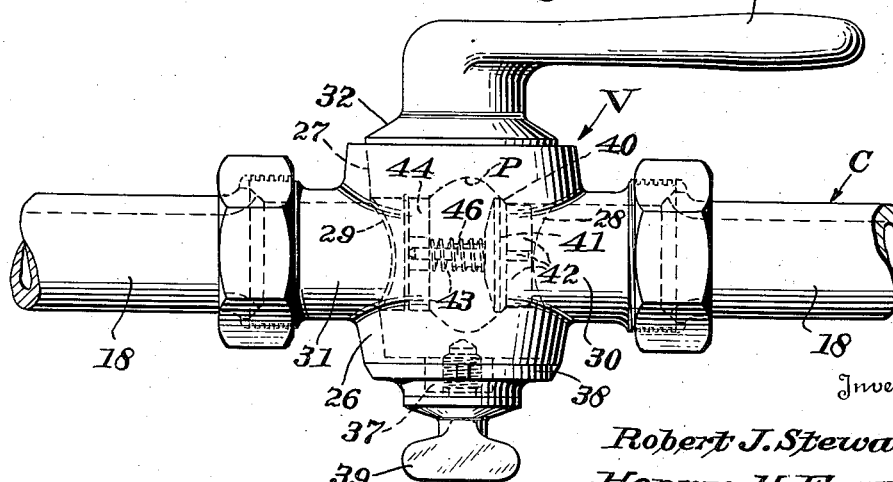
Figure 2 is an elevation of a preferred form of duplex valve connected into the supply line.

Referring to the drawings, reference numeral 10, Fig. 1, designates a filler tank or bowl supported on a pedestal 11 for rotation on a vertical axis. Filler heads 12 and 13 are equipped with vent tubes 14 and 15 which extend upwardly into the tank to terminate above the liquid level L therein, this level being maintained by a float valve 16 at the lower end of the vertical pipe 17 which constitutes a part of the supply conduit generally designated C and including also a horizontal portion 18, a vertical portion 19 and a horizontal portion 20 connected into the elevated milk cooling trough or source of liquid supply 21. A regulatable source of vacuum 22 is connected through a pipe 23 and a swivel joint 24 into the top of the bowl 10 through the cover 25.

Reference letter V designates, as a whole, the new valve which is shown interposed in the conduit section 18, although the valve could be disposed elsewhere, for example, in the section 19, so long as a proper operating head is obtained.

The valve comprises a casing 26 formed with a conical seat 27 with which diametrically opposed inlet and outlet ports 28 and 29 are in communication. The ports are continued through necks 30 and 31 threaded for the reception of coupling members by which the casing is connectable in the conduit C.

Reference numeral 32 designates a plug cooperable with seat 27, the plug as here shown being equipped with an integral operating handle 33. The plug has a diametric passage P having coaxial cylindrical end portions 34 and 35 and an intermediate enlargement 36. At its lower end the plug is formed with a boss 37 which centers a cap ring 38 held in position by a thumb screw 39, the ring underlying the bottom of the casing to position the plug operatively therein. By removing the thumb screw the valve can be quickly disassembled for cleaning.

Adjacent passage portion 35, enlargement 36 is formed as a seat 40 with which is cooperable a check valve 41. The valve disc has formed thereon guide ribs 42 which are slidable in the passage portion 35 and on its opposite side the disc is equipped with a stem 43 which is guided in a spider 44. A compression spring 46 is interposed between the spider and the valve disc and acts to seat the latter, the spider being maintained against the action of the spring by a split retainer wire 47 which is partly received in a shallow groove formed in passage portion 34 just outwardly of the spider.

In Figures 3, 4 and 7, the check valve 41 is faced toward the inlet port 28 so as to be subject to the pressure in advance of the valve existing by reason of the head of liquid and subject also to the vacuum effect in the system to the rear of the valve. The strength of spring 46 is such that if there is, for example, at least a six inch head of liquid in advance of the valve, the check valve will be unseated and flow will take place, as controlled by the float valve, from the trough 21 to the bowl 10. Should the head fall below the predetermined minimum, as a result of the running out of the supply, the check valve will close, shutting off the supply line so that air cannot be drawn into the filler bowl.

The valve plug has a solid side wall 48 and an opposite side wall 49 which is provided with an opening 50 communicating with the passage P behind the check valve. When it is desired to drain the conduit, the plug is turned to the position shown in Figure 8 to bring opening 50 into communication with the inlet port 28 and passage portion 34 into communication with the outlet port 29. The conduit can now drain completely back into the bowl 10.

If it should be desired to positively shut off the passage, the valve plug is turned to the position shown in Figures 5 and 6, wherein the solid side wall 48 completely closes the inlet port.

In other words, depending upon the position of the plug 32, the conduit C is positively cut off, Figs. 5 and 6, or the check valve is by-passed, Fig. 8, or the check valve is placed in control of flow in the conduit, Figs. 3, 4 and 7. In the last-mentioned case, the check valve serves to differentiate between fluids of different specific gravity; in the present case between milk and air. The vacuum effect is of itself incapable of unseating the check valve, such action being possible only as a result of the total pressure of the liquid in the conduit acting on the valve. In the by-passing position of the plug, the conduit can be completely drained since no part of it, as here shown, is below the valve V in advance of the latter.

It will be understood that the invention is susceptible of varied embodiment and we by no means limit ourselves to the specific disclosure herein, the scope of the invention being determined in the following claims.

We claim:

1. Filling apparatus comprising a filler tank, a container filling device connected to said tank, a source of liquid supply, a conduit connecting the source and tank and terminating below the normal liquid level in the latter, vacuum producing means opening to said tank above said liquid level, a valve intermediate the length of said conduit, valve closing means to urge said valve to closed position, said closing means acting with a given force in a direction opposite to that in which liquid flows in said conduit and also opposite to the direction in which the vacuum is exerted by said vacuum producing means, said given force of said closing means being greater than the vacuum effect exerted by said vacuum producing means but no greater than the opposing force exerted by a predetermined head of liquid in said conduit, whereby the valve will close when the head of liquid is reduced to said predetermined head.

2. Filling apparatus comprising a filler tank, a container filling device connected to said tank, a source of liquid supply, a conduit connecting the source and tank and terminating below the normal liquid level in the latter, vacuum producing means opening to said tank above said liquid level, a valve intermediate the length of said conduit, valve closing means to urge said valve to closed position, said closing means acting with a given force in a direction opposite to that in which liquid flows in said conduit and also opposite to the direction in which the vacuum is exerted by said vacuum producing means, said given force of said closing means being greater than the vacuum effect exerted by said vacuum producing means but no greater than the opposing force exerted by a predetermined head of liquid in said conduit, whereby the valve will close when the head of liquid is reduced to said predetermined head, said valve being operable to a position in which liquid may bypass said closing means.

3. Filling apparatus comprising a filler tank, a container filling device connected to said tank, a source of liquid supply, a conduit connecting the source and tank and terminating below the normal liquid level in the latter, vacuum producing means opening to said tank above said liquid level, a rotary valve in said conduit comprising a plug adapted to close the conduit in one position and to open the conduit in another position, and a check valve in said plug adapted in another position of the latter to control flow through the conduit, valve closing means to urge said valve to closed position, said closing means acting with a given force in a direction opposite to that in which liquid flows in said conduit and also opposite to the direction in which the vacuum is exerted by said vacuum producing means, said given force of said closing means being greater than the vacuum effect exerted by said vacuum producing means but no greater than the opposing force exerted by a predetermined head of liquid in said conduit, whereby the valve will close when the head of liquid is reduced to said predetermined head.

ROBERT J. STEWART.
HENRY H. FRANZ.